United States Patent
Hobbs, II

[15] 3,655,094
[45] Apr. 11, 1972

[54] METHOD AND APPARATUS FOR MEASURING AND PROPORTIONING FLUIDS

[72] Inventor: James C. Hobbs, II, 4384 Ingraham Highway, Miami, Fla. 33133

[22] Filed: Dec. 29, 1969

[21] Appl. No.: 888,389

[52] U.S. Cl. ................................222/1, 222/134, 222/135, 222/309
[51] Int. Cl. .................................B67d 5/52, G01f 11/02
[58] Field of Search..................222/134, 319, 438, 135, 309, 222/137, 1

[56] References Cited

UNITED STATES PATENTS 3,446,400 5/1969 Hobbs et al. ..........................222/145 X
3,339,804 9/1967 Bader ....................................222/135

*Primary Examiner*—Robert B. Reeves
*Assistant Examiner*—Francis J. Bartuska
*Attorney*—Watts, Hoffmann, Fisher & Heinke

[57] ABSTRACT

A semi-automatic, motor operated apparatus for measuring and proportioning liquids including a dual diameter shaft acting as a displacement piston to measure precise amounts of a liquid to be diluted and a diluent.

A method of accurately measuring a liquid sample and a diluent in which a fluid system is vented to the atmosphere after measured amounts of the sample and diluent have been brought into the system and before they are discharged therefrom.

8 Claims, 11 Drawing Figures

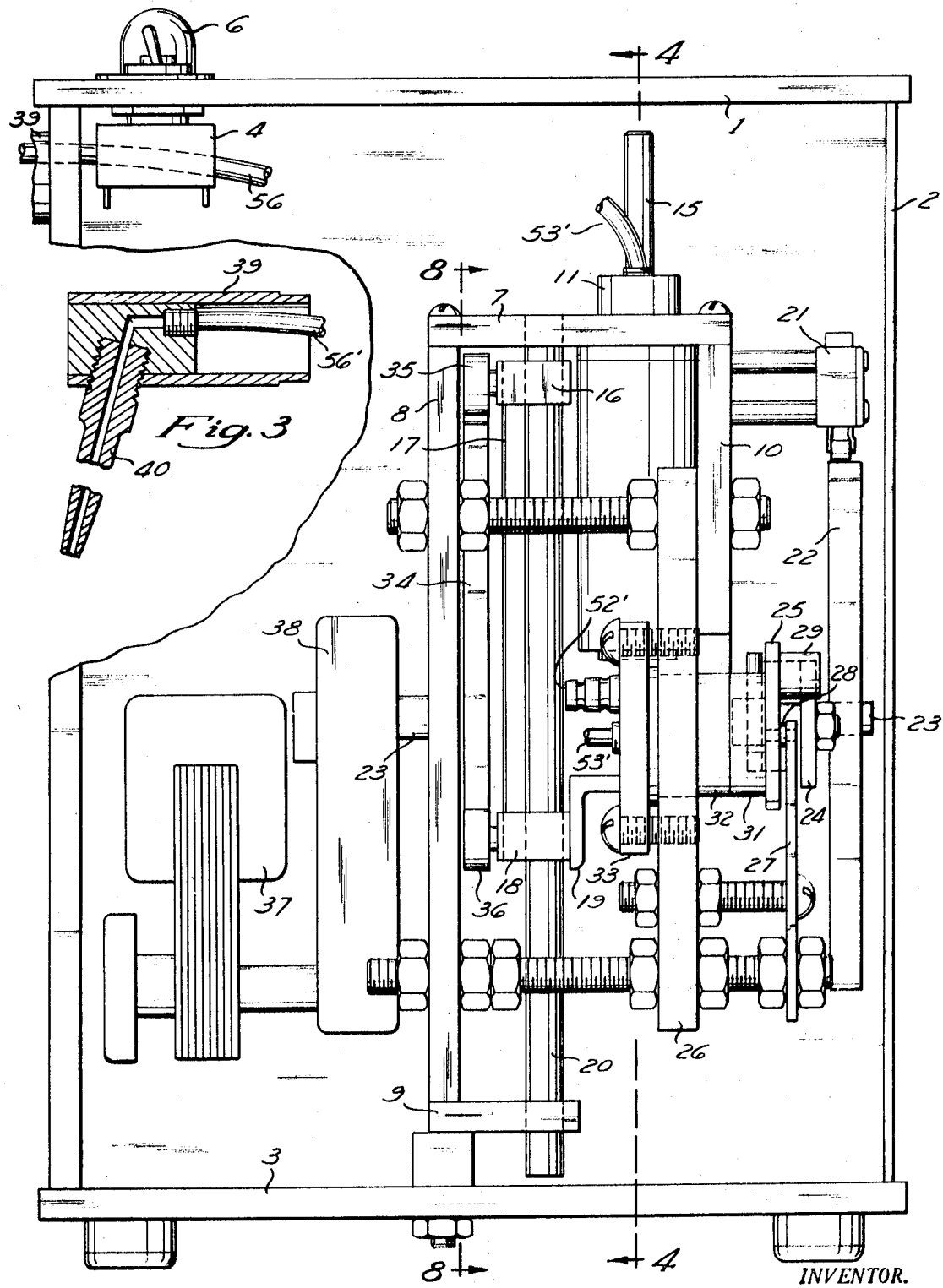

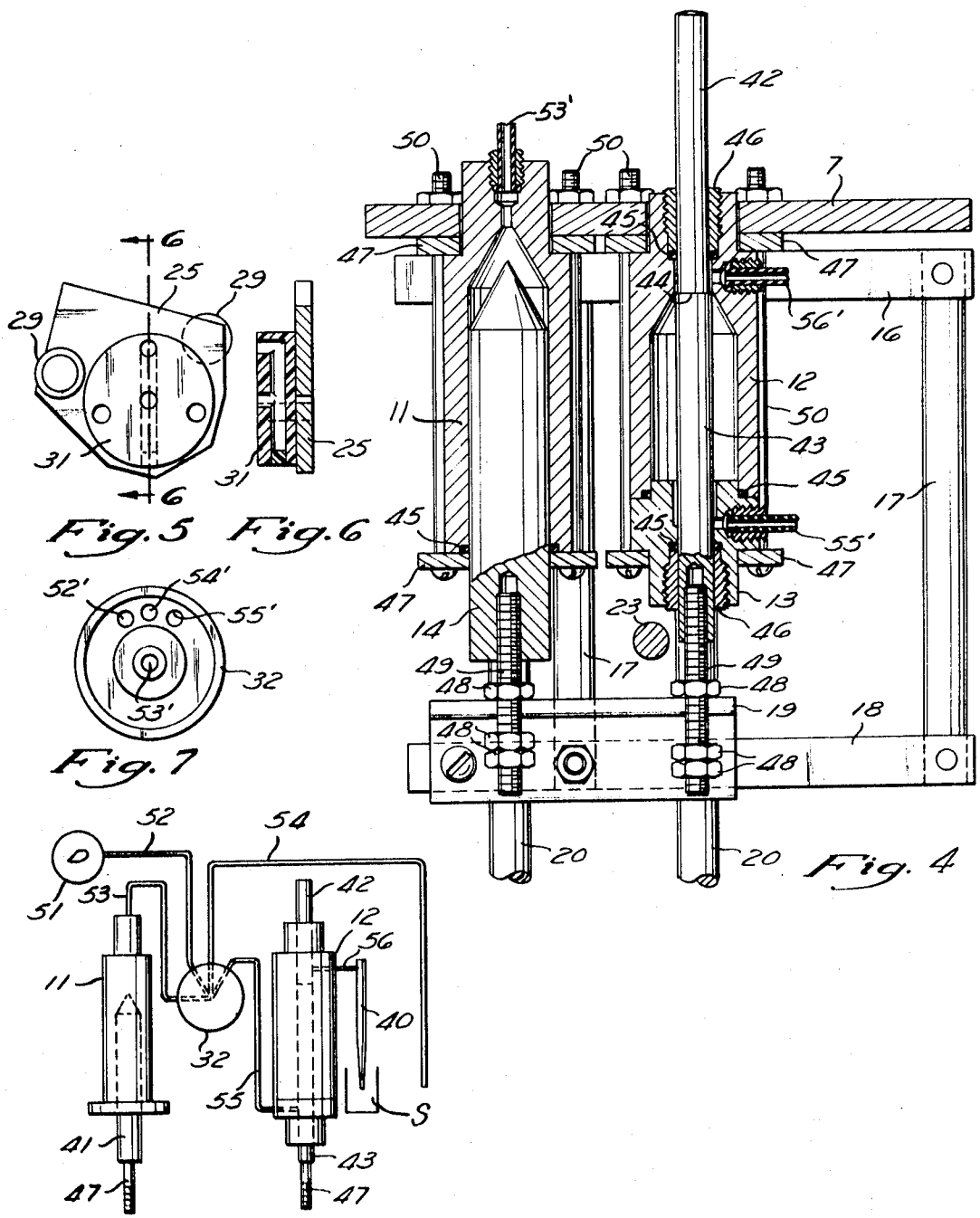

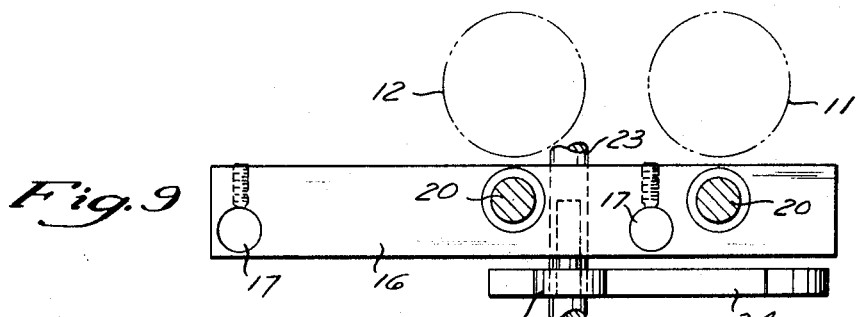
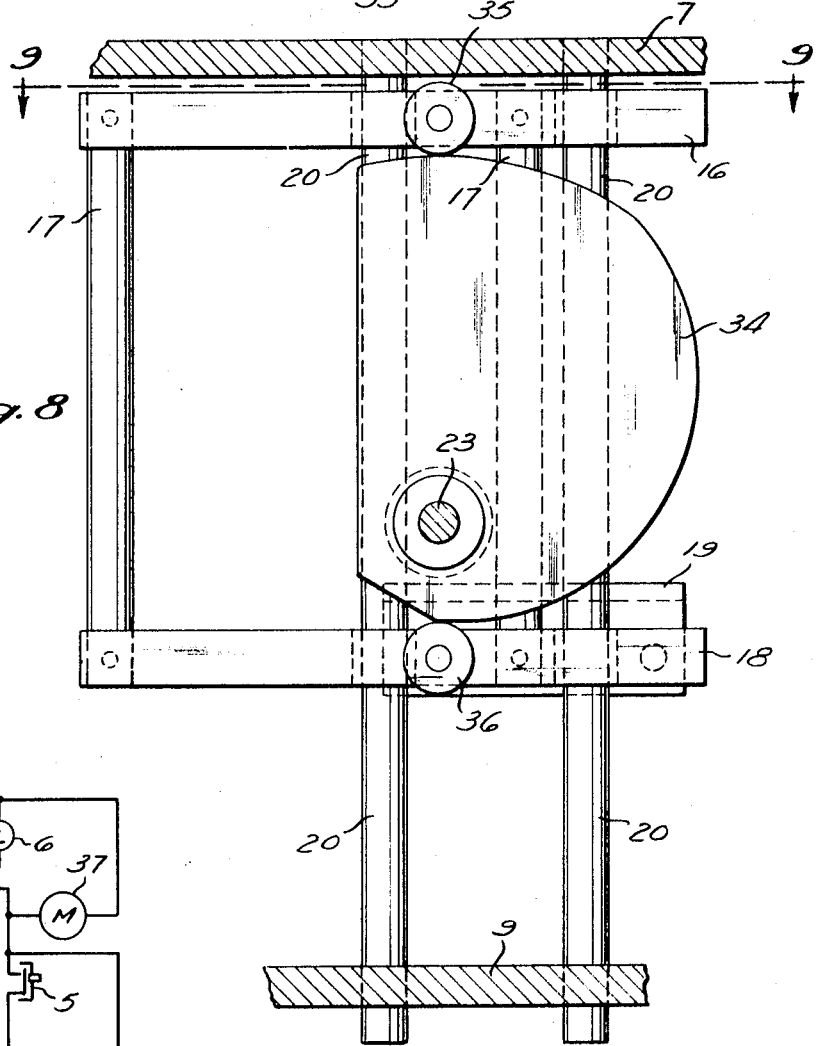

METHOD AND APPARATUS FOR MEASURING AND PROPORTIONING FLUIDS

BACKGROUND OF THE INVENTION

An important part of clinical diagnostic procedures includes the study, analysis and tests of body liquids under varying conditions and at intervals to determine changes in the liquid. In most cases, such tests are made with a diluted sample of the liquid. In many cases, it is desirable to dilute a sample with several hundred times as much diluent.

Many efforts have been made to devise satisfactory means for accurately diluting samples of such liquids but, so far as I am aware, these efforts have not been fully satisfactory.

THE PRIOR ART

The prior art known to me and most nearly pertinent to the present invention include the apparatus of U.S. Pat. Nos. 3,127,062 and 3,446,400.

None of the prior apparatus employing a piston to measure the sample and with which I am familiar was entirely satisfactory to provide exceedingly small precise amounts of the sample to be examined.

When the amount of the sample was small, the piston could not be made and operated within acceptable tolerances. When the amount of the sample was large, the piston displacement was so large that the variations in the stroke of the piston and in the amount of the sample were beyond tolerable limits.

SUMMARY

One embodiment of the present invention is apparatus including a cylinder having extending therethrough a two diameter piston with only a small difference in the diameters and with the same type of seal at each end of the cylinder. The effective piston area is the small difference between the projected areas of the two ends of the piston and that difference may closely approach zero. The piston may be readily produced within manufacturing tolerances and operated to measure various amounts of the sample within tolerable limits.

The apparatus of the present invention may be used to measure precise volumes of liquid ranging from a fraction of a cubic centimeter down to a small fraction of a cubic millimeter, and do so repeatedly without significant variations.

Another embodiment of this invention is a method in which variations in the volumes of a sample due to variations of pressure are avoided by venting the fluid containing system to the atmosphere between the filling of the system with the liquids and the expelling of them therefrom.

BRIEF DESCRIPTION OF THE DRAWINGS

The apparatus will be described in detail with reference to the drawings in which:

FIG. 2 is a side elevational view of the dilutor apparatus of FIG. 1;

FIG. 3 is a sectional view of probe and the probe mount;

FIG. 4 is a sectional view of the arrangement of the diluent cylinder and the sample cylinder of the apparatus of FIG. 1;

FIG. 5 is an elevational view of the valve cover and valve lever;

FIG. 6 is a sectional view of the valve cover and valve lever of FIG. 5;

FIG. 7 is an elevational view of valve body;

FIG. 8 is an elevational view of the rack and actuating cam of the apparatus of FIG. 1;

FIG. 9 is a top view of the parts shown in FIG. 8;

FIG. 10 is a diagrammatic drawing of the apparatus of FIG. 1; and

FIG. 11 is a diagrammatic drawing of the electric wiring of the apparatus of FIG. 1.

As shown in FIG. 1, the dilutor apparatus includes top plate 1, housing 2, and bottom plate 3 to enclose the moving parts. Mounted on top plate 1 are the controls and signals for operating the dilutor. Switch 4 controls the power supply. Button switch 5 is a press and hold to close switch to start each of the two cycles of the dilutor as will be explained below. Light 6 indicates there is power to the dilutor and the motor is stopped.

Figure 1:
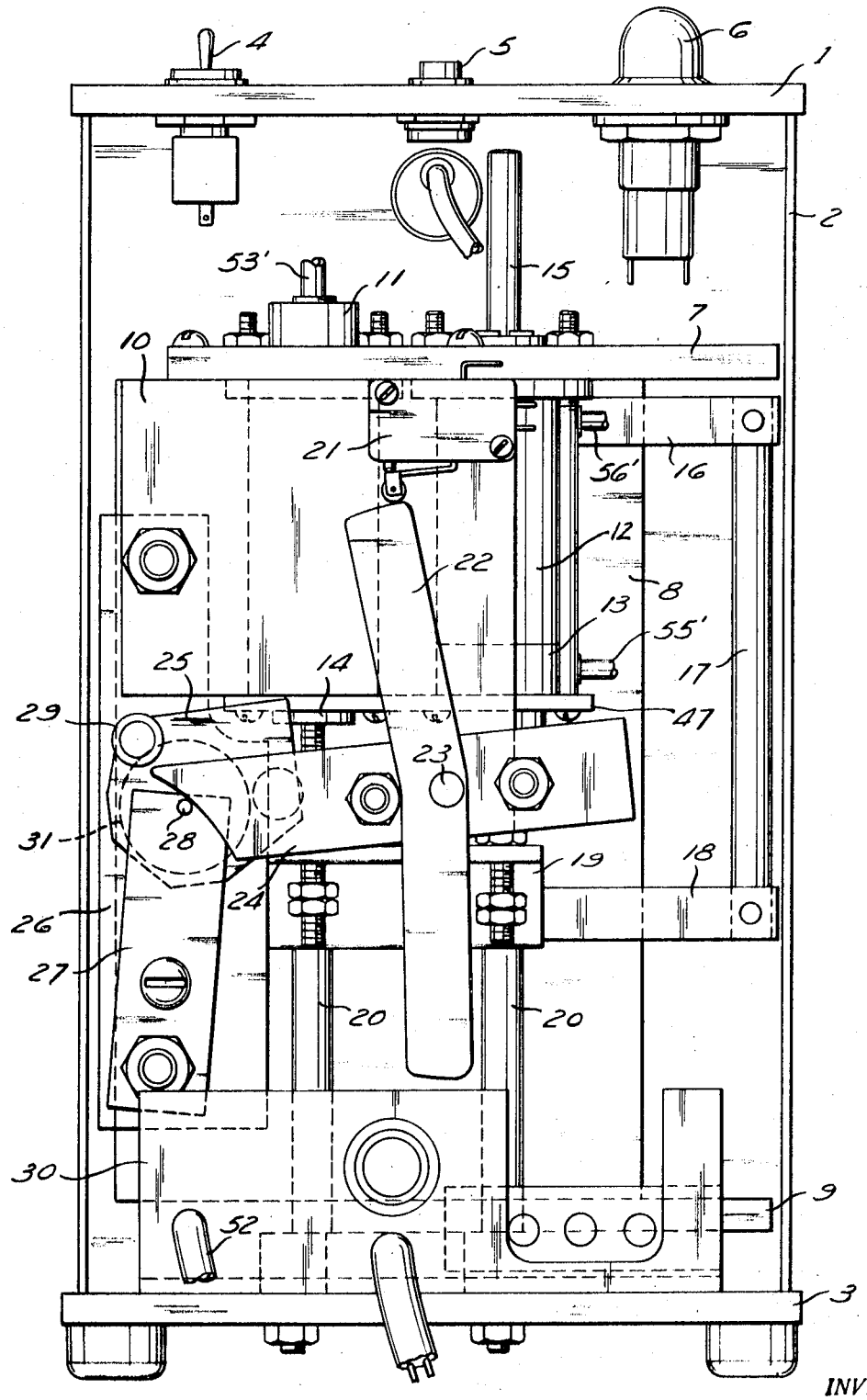
FIG. 1 is an elevational view of dilutor apparatus showing the general arrangement of the parts.

An internal rigid frame structure to position and support the parts includes top frame plate 7 mounted along one edge on the upper edge of frame plate 8. Frame plate 8 rests upon and is connected along its bottom edge to a side portion of bottom frame plate 9 which is connected to bottom plate 3 in order to maintain a fixed position in relation to the outer enclosing parts. Support plate 10 is connected along one edge to the top frame plate 7.

Diluent cylinder 11 and sample cylinder 12 are fastened to the underside of frame plate 7. Sample cylinder closure 13 is on the lower end of sample cylinder 12. Diluent piston 14 enters only the lower part of diluent cylinder 11 for reciprocal motion therein. Sample piston 15 extends through both sample cylinder 12 and closure 13 as will be more fully described later.

Movable rack assembly includes top rack bar 16, two rack rods 17 (only one is shown in FIG. 1), bottom rack bar 18 and angle 19 connected to bar 18. As will be explained later, the rack assembly moves up and down while being guided by guide rods 20 that extend from top frame plate 7 to bottom frame plate 9.

Double throw microswitch 21 is mounted on support plate 10 and is actuated by switch arm 22 fixed to rotating shaft 23.

Valve arm 24 is also mounted on shaft 23. As valve arm 24 rotates, the end portions shift the position of valve lever 25 as later described. Valve plate 26 is fastened to support plate 10 and carries pressure plate 27 adjustably mounted thereon to urge pressure pin 28 against valve lever 25. Two followers 29 are mounted on and so positioned on opposite sides of valve lever 25 to be engaged by valve arm 24 for sequentially shifting valve cover 31 on valve body 32 (not shown in FIG. 1).

Bracket 30 has suitable holes and fittings to accommodate a diluent supply tube, electrical cord, fuse, and electrical terminals for a remote foot operated switch which is not shown.

The side elevational view of FIG. 2 further shows the arrangement of the dilutor. Valve cover 31 is fixed to valve lever 25 and is pressed against valve body 32 by pressure plate 27 acting through pressure pin 28. In the preferred form, cover 31 and body 32 are made of a suitable non-metallic material to reduce friction, resist wear, and provide a fluid tight surface engagement. Valve body 32 is held in position on valve plate 26 by valve clamp 33.

Cam 34 is mounted on and rotates with shaft 23. Followers 35 and 36 are connected to rack bars 16 and 18 and engaged by cam 34 for up and down movement of the rack along guide rods 20. Cam 34 is formed to avoid rapid acceleration and deceleration of the pistons in the cylinders during the up and down movement.

Motor 37 is connected to shaft 23 through a speed reduction gear box 38 to obtain a suitable rotational speed of cam 34 of about 6 r.p.m.

FIG. 3 shows a detail of probe mount 39 and probe 40. Probe 40 is made sufficiently long to hold the entire volume of the sample to be mixed and diluted by the apparatus.

FIG. 4 is a part sectional view showing the internal parts of diluent cylinder 11 and sample cylinder 12. Diluent piston 14 is generally dimensioned to have a large displacement compared to the displacement of the sample piston. The diameter of the diluent piston is selected so that the cross sectional area multiplied by the stroke will deliver the fixed volume of diluent desired. An alternate piston-cylinder assembly to deliver a different volume may be substituted for the assembly shown.

The piston for the sample cylinder has a small cylinder end 42 and a large cylinder end 43 with a step 44 between the two ends so positioned to be always in the sample cylinder. The volume of displacement of the sample piston is the difference in the cross sectional area of the two ends of the piston multiplied by the stroke. By making the two diameters only slightly different it is possible to secure a precise amount of displacement well within tolerable limits by adjusting the stroke within realistic limits.

Sealing both the sample and diluent pistons are "O" rings 45 of proper size held in position by threaded sleeves 46, cover 13 or cylinder plates 47. Nuts 48 are positioned and locked on studs 49 to obtain the desired stroke of each piston within each cylinder. The nuts are engaged by angle 19 as the rack goes up and down. The desired stroke of each piston is secured by allowing sufficient free travel before the angle contacts the nuts. The cylinder assemblies are held in position against top frame plate 7 by cylinder screws 50.

The valve cover 31 and valve lever 25 of FIG. 5 are mounted to permit rotation of the surface of cover 31 on the face of valve body 32. Valve cover 31 has a central port connected by an internal passage to a second port near the edge as shown in the sectional drawing FIG. 6.

The valve body 32 of FIG. 7 has a central port and three additional ports, spaced along an arc near the edge, to communicate with the single matching port on cover 31. The purpose of each port will be described later in connection with the operation of the dilutor.

FIG. 8 is a part elevational and part sectional drawing of the rack and its relationship to cam 34. As cam 34 rotates with rotating shaft 23, the cam pushes down on bottom follower 36 mounted on rack bar 18. Bottom rack bar 18 is connected to top rack bar 16 by two rack rods 17 so that the assembled parts move down as a unit along guide rods 20 fixed in position in top frame plate 7 and bottom frame plate 9. After about one-half of a revolution the cam engages follower 35 for upward movement of the rack. In the preferred form, bearing guides are inserted in the two rack bars to engage rods 20.

FIG. 9 is a part plan and part sectional drawing of the parts shown in FIG. 8. Also shown in dashed lines are the outlines of diluent cylinder 11 and sample cylinder 12. In the preferred construction, guide rods 20 are positioned as close as possible to each of the cylinders for a minimum of binding and wear between the rods and the rack.

FIG. 10 is a diagrammatic drawing of the tubing and parts of the dilutor. The probe, cylinders, valve and a diluent source are connected by small flexible tubing. The tubing identified in FIG. 10 is connected to the parts of the dilutor with the same number and a prime (') sign.

Tube 52 connects a supply of diluent 51 with port 52' of valve 32. Central port 53' of valve 32 is connected to diluent cylinder 11 by tube 53. The middle outer port 54' of valve 32 is connected to atmospheric vent line 54 having its open end at the same elevation as the open end of the probe in order to equalize the hydraulic pressure in all parts of the apparatus when valve cover 31 is aligned with this port. The remaining outer port 55' of valve body 32 is connected to sample cylinder cover 13 by diluent transfer tube 55. Sample cylinder 12 is connected to probe 40 by sample tube 56.

The electric circuits for operating the dilutor are shown in FIG. 11. All power to the dilutor is controlled by on-off switch 4. Microswitch 21 is shown in the motor running position. The motor will continue to run until switch arm 22 engages switch 21 to open the motor circuit and close the circuit to indicator light 6. To operate the dilutor, button switch 5 is manually closed to by-pass microswitch 21 until switch arm 22 rotates out of contact with microswitch 21 to close the motor circuit. The motor will continue to run until the other end of switch arm 22 trips switch 21 at which time indicator light 6 will come on. Thus the indicator light 6 indicates that there is power to the dilutor and that it will operate when button switch 5 is closed. If desired, a remote foot switch 57 may be wired parallel to button switch 5 to permit the technician to have both hands free.

METHOD AND OPERATION

By closing switch 4 either the indicator light 6 will be turned on or the motor will run until switch arm 22 engages switch 21 to stop the motor. A remote diluent supply 51 is connected to the dilutor by tube 52 and the dilutor is then operated through several cycles by pressing button switch 5 each time the motor stops until diluent is expelled from probe 40. The expelling of diluent from probe 40 indicates that the entire system, including diluent cylinder 11, sample cylinder 12, valve body 32, tube 52, tube 55, tube 56 and probe 40 are filled with diluent.

The sample-drawing cycle is carried out by pressing button switch 5 to start the motor. As soon as the motor is started, valve arm 24 engages follower 29 to move the valve cover in position to connect diluent supply 51 with diluent cylinder 11 by means of tubes 52 and 53 while closing the ports to tubes 54 and 55. Rotation of cam 34 pushes the rack downward until angle 19 engages nuts 48 on studs 49 at which point further downward travel of angle 19 withdraws diluent piston 14 from cylinder 11 and the larger end 43 of sample piston from cylinder 12. Diluent is thus drawn into cylinder 11 from the supply and into cylinder 12 from probe 40 while the small but precise amount of sample is drawn from a sample container S into only the tip portion of probe 40.

When the pistons have reached the end of the withdrawal stroke, switch arm 22 will engage switch 21 to stop the motor. The operator then removes the sample container from around the end of the probe and positions a different container under the probe to receive the admixture of diluent and sample.

The expelling cycle is started by pressing button switch 5 to start motor 37 and rotate cam 34 to move the rack upward. Just before the rack begins to move upward, valve arm 24 shifts valve cover 31 first to connect cylinder 11 to vent line 54 and then to connect cylinder 11 to cylinder 12 through tubes 53 and 55. The intermediate connection to an atmospheric vent line is very important because it equalizes the hydraulic pressure inside the various connecting tubes just prior to expelling the admixture. Without such an equalizing step, it has been found that the hydraulic pressure caused by having the diluent supply elevated above the dilutor is sufficient to enlarge tube 53 beyond tolerable limits and thus increase the volume subsequently expelled when the pressure is released through cylinder 11 and probe 40.

Immediately after valve cover 31 is positioned to connect port 53' with port 55', the cam begins to move the rack and connected pistons upward. Diluent is forced out of cylinder 11 through tube 53, the valve, tube 55, cylinder 12, tube 56, and out the open end of probe 40. As this flow occurs the small sample is expelled from the probe first and the diluent follows after first flowing through sample cylinder 12. With this flow path it is apparent that both sample cylinder 12, probe 40 and all connecting tubes are flushed out with each use.

After the expelling cycle is completed, switch 21 is again engaged by arm 22 to stop the motor. The measuring and diluting have been completed and the dilutor system remains filled with diluent and in condition to start another dilution.

It will be understood from the foregoing disclosure that the present invention provides apparatus for measuring predetermined variable volumes of the sample liquid for dilution and that such precise measurement may be made time after time and hours and months apart. In the case of blood samples where a very small amount of blood should be diluted, for example, 5 cubic millilitres or less, the present apparatus may be used to dilute such a small amount of liquid with as much as 400 times as much of the diluent. Thus the testing may be carried out with only a small amount of blood and thereby without any adverse effects on the patient.

It will also be understood that the seals at each end of the two diameter piston are self-compensating and do not affect the measured volume of the sample.

It will also be understood that the present apparatus measures the exact volume of the fluid under atmospheric pressure by venting the system just prior to expelling the diluted mixture. Thus this apparatus avoids the previously experienced variations in the amount of the sample with variations in the internal volume of the system. One of such variations occurred when plastic tubing was used because the volume of liquid within the tubing varied when the pressure within the tubing varied. The pressures varied when the elevation of the diluent supply was changed, as by being moved from an elevated shelf to a lower position or even by a change of the liquid level of the diluent in the storage vessel.

Having thus described this invention in such full, clear, concise and exact terms as to enable any person skilled in the art to which it pertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

1. Apparatus to dilute a sample of liquid with a diluent comprising:
   a. sample measuring means including a sample cylinder, a two diameter piston extending through, and beyond each end of, said cylinder and having the diameter at one end only slightly larger than the diameter at the other end and compensating seals around the ends of the piston and engaging the cylinder,
   b. diluent measuring means including a diluent cylinder and a piston within said cylinder,
   c. sample collecting means including a probe communicating with the sample cylinder through a first end and a supply of said sample through a second end,
   d. diluent collecting means including a multi-port valve having interconnecting ports between said diluent cylinder and a supply of said diluent,
   e. valve shifting means sequentially to connect said diluent cylinder with said diluent supply, a vent port, and the sample cylinder, and
   f. piston moving means to reciprocate the pistons in their cylinders.

2. The apparatus of claim 1 in which the piston moving means is a cam, a first follower engaging said cam to move said pistons in one direction, and a second follower engaging said cam to move the pistons in the opposite direction.

3. The apparatus of claim 2 in which the cam moves both pistons simultaneously.

4. The apparatus of claim 1 in which the piston moving means engages separate threaded adjustment means attached to each piston to control the length of movement of each piston in each cylinder.

5. The apparatus of claim 1 in which the sample cylinder has a first port near one end thereof communicating with the probe, and a second port near the other end communicating with the muli-port valve whereby the diluent expelled from the diluent cylinder is discharged through the sample cylinder.

6. The apparatus of claim 1 in which the vent port is connected to a tube having an outlet end at the same elevation as the second end of the probe.

7. The method of diluting liquids which comprises the steps of connecting a source of diluent to a closed system, said system including a diluent measuring chamber, a liquid sample measuring chamber, and a probe having an open end, filling said system with diluent, connecting the probe to a source of sample liquid, simultaneously enlarging the volume of said chambers and thereby drawing a measured amount of diluent into said diluent chamber and a measured amount of sample liquid into said probe, disconnecting the system from the diluent supply, equalizing the pressure in the system by connecting the diluent measuring chamber to a tube having an outlet at the same elevation as the open end of the probe disconnecting the diluent chamber from said tube, and expelling said measured amounts of diluent and sample liquid through the probe.

8. The method of diluting liquids of claim 7 in which the measured amount of diluent flows through the entire system before being expelled through the probe.

* * * * *